United States Patent Office
3,686,123
Patented Aug. 22, 1972

3,686,123

CLEANING COMPOSITION

Ueki Hiroshi, Yokohama-shi, Japan, assignor to Kurita Industrial Co., Ltd., Osaka-shi, Japan No Drawing. Continuation of abandoned application Ser. No. 784,217, Dec. 16, 1968. This application Apr. 5, 1971, Ser. No. 131,498
Int. Cl. B08b 3/08, 3/09
U.S. Cl. 252—87 7 Claims

ABSTRACT OF THE DISCLOSURE

The present invention provides cleaning agent compositions comprising at least one compound selected from the group consisting of acids such as hydrochloric acid, etc., at least one compound selected from the group consisting of thiourea and thiourea derivatives and at least one compound selected from the group consisting of hydrazine and hydrazine compounds. The compositions are suitable for removing copper containing scales. The removal of scales containing copper is now made possible by a single application of the present compositions, the removal procedures thus being simplified and saving much time. A still further advantage is the prevention of the development of corrosion on the surface of the steel onto which the compositions are applied.

This application is a continuation of Ser. No. 784,217 filed Dec. 16, 1968, now abandoned.

BACKGROUND OF THE INVENTION

(a) Field of the invention

The present invention relates to cleaning agent compositions which can remove the copper containing scales by a simple working method and in a short time. The cleaning agent compositions comprise at least one compound selected from the group consisting of acids such as hydrochloric acid, etc., at least one compound selected from the group consisting of thiourea and thiourea derivatives and at least one compound selected from the group consisting of hydrazine and hydrazine compounds. By the use of this cleaning agent, the copper containing scales can be removed by a simple procedure and in a short time. Another advantage is that the cleaning agent prevents the development of corrosion on the surface of steel.

(b) Description of the prior art

When copper or alloys of copper are used together with steel in a boiler, heat-exchanger, and other apparatus, copper and copper oxides are found in considerable quantities in the scales deposited on the surfaces of the vessel or tube in which water is heated. With regard to the removal of such copper component formed in the scales, a cleaning method using an ammonia solution containing an oxidant and a cleaning method using an acid solution containing a copper dissolving agent have been widely known and used. In the case of cleaning using an ammonia solution containing an oxidant, however, the copper components in the scales can be eliminated, but the iron oxides which comprise the greater part of the scales can not be removed. It is therefore necessary to conduct further cleaning by means of an acid solution in order to remove the remaining scales, which makes the cleaning work intricate and requires more time for cleaning, the use of such method thereby requiring a large amount of time, labor and money. On the other hand, cleaning with the use of an acid solution, which contains a copper dissolving agent, such as thiourea, dissolves and removes iron oxide and also copper and copper oxide in the scales at the same time. This method, however, removes only a very small amount of copper and can be applied only to scales which contain only a small quantity of copper or to relatively thin scales. Such being the case, in the cleaning of the boilers in a steam electric power-plant, where the scales contain much copper, an ammonia solution is generally used. Thiourea or its derivatives are conventionally used as a copper dissolving agent when the cleaning is done by the use of an acid solution. Dimethyl thiourea or thiourea are most widely used for this purpose. They have an excellent dissolving effect on copper and show satisfactory results in promoting the dissolution of copper in an acid solution, especially in a hydrochloric acid solution. However, the solubility of the compounds of copper and dimethyl thiourea or thiourea contained in the solution is not very high, so that they form a milk-white precipitate in the acid cleaning solution. The precipitate deposits on the tube surface of the boiler or heat-exchanger, thus greatly reducing the cleaning effect. This tendency is especially displayed when the concentration of iron ions or copper ions present in the solution is high.

At the time of cleaning with the acid solution, inorganic or organic reducing agents, such as stannous chloride and L-ascorbic acid, are used for the purpose of preventing the corrosion or decay of steel due to the oxidation effect of the oxidizing ions, such as $Fe^{3+}$, present in the solution as a result of the use of the acid cleaning agent. However, when these reducing agents are present in the solution, the milk-white precipitate, which is composed of the compound (complex salt) of copper and copper dissolving agents, such as thiourea and thiourea derivatives, is formed in much greater quantity than when the reducing agents are not present in the solution, thus lessening not only the dissolving effect on the copper contained in the scales but also the dissolving effect on the entire scales.

Such being the case, there have been no cleaning methods which are satisfactory enough to remove the copper containing scales in a simple and yet highly efficient procedure; and such method has long been hoped for.

SUMMARY OF THE INVENTION

The object of the present invention is to provide an improved procedure by which the copper containing scales will be removed in a simple method and with highly satisfactory results.

The object of the present invention is to provide an improved method by which the copper containing scales can be removed by means of only an acid cleaning procedure.

The object of the present invention is to provide the improved compositions of the cleaning agents which are suitable for removing the copper containing scales in a simple method and with highly satisfactory results.

The present invention relates to cleaning agent compositions comprising (1) at least one compound selected from the group consisting of acids, such as hydrochloric acid, etc., (2) at least one compound selected from the group consisting of thiourea and thiourea derivatives and (3) at least one compound selected from the group consisting of hydrazine and hydrazine compounds, which compositions are suitable for removing copper containing scales. By the use of the cleaning agent compositions prepared according to the present invention the scales can be removed by a simple and convenient procedure, in a shorter time, with the highly satisfactory results; and a further contribution of this improved procedure is the prevention of the development of corrosion on the surface of the steel to which the compositions are applied.

DESCRIPTION OF THE PREFERRED EMBODIMENTS

The present invention relates to cleaning agent compositions comprising at least one compound selected from the group consisting of acids, at least one compound selected from the group consisting of thiourea and thiourea derivatives and at least one compound selected from the group consisting of hydrazine and hydrazine compounds.

An inorganic acid is usually used in the cleaning agent composition. As for inorganic acids used in preparing the compositions according to the present invention, any acids such as hydrochloric acid, sulfuric acid, phosphoric acid, and sulfamic acid is used. Thiourea and thiourea derivatives are copper dissolving agents and are believed to combine with copper to form thiourea copper complexes and thiourea derivatives copper complexes, thus promoting the dissolution of copper. Thiourea derivatives which can be used in this invention are alkylthioureas and phenylthioureas, the alkylthioureas usually being dimethyl thiourea and diethyl thiourea, and the phenylthioureas usually being diphenyl thiourea.

It is believed that the hydrazine and hydrazine compounds act as a solubilizer which increases the solubility of said complexes in the acid solution. Said hydrazine compounds which can be used in the present invention are commercially obtainable hydrazine compounds such as hydrazine hydrochloride, hydrazine sulfate, hydrazine phosphate, hydrazine carbonate, hydrazine maleate, and hydrazine citrate. If necessary, two or more of the respective copper dissolving agents and solubilizers mentioned in the foregoing can be used together. Said composition can be used together with any of the conventionally well-known corrosion inhibitors, if required. As for corrosion inhibitors, such commercially obtainable corrosion inhibitors for pickling agents as "Ibit" (trade name of the product manufactured by Sumitomo Chemical Co., Ltd.), "Rodin" (trade name of the product manufactured by Nippon Paint Co., Ltd.), hexamethylenetetramine and thiocyanate may be mentioned. In practical use, they are used singly or in a selected combination of two or more.

As for the acids used in the cleaning agent compositions according to the present invention, hydrochloric acid is prinicpally used and its concentration should range between 0.1% and 20%, preferably between 3% and 10%. The acids chiefly dissolve the iron oxide in the scales.

The amount of the copper dissolving agent, namely, thiourea and thiourea derivatives, is sufficient to provide a 0.5–10% concentration thereof in the acid solution, and the thiourea and thiourea derivatives in the composition act upon copper in the presence of an acid to form complex salts and thereby dissolve copper in the solution of the cleaning agent. More than 1/5 mol., preferably 1/4–1/2 mol., of hydrazine or hydrazine derivatives is used per 1 mol. of thiourea or thiouera derivatives. The hydrazine or hydrazine derivatives act upon the complex salt, which is formed of thiourea or thiourea derivatives and copper, and promote the dissolution of copper by enhancing the solubility of said complex salt in the acid solution, and consequently hydrazine or hydrazine derivatives are believed to prevent the precipitation of said complex salt.

At the same time, hydrazine or hydrazine derivatives, which are endowed with a reducing power, have the function to prevent the steel from undergoing corrosion due to the oxidizing ion, such as $Fe^{3+}$, present in the cleaning agent, and further they are believed to have an ability to promote the reaction to form the complex of copper ion and thiourea or thiourea derivatives.

By the use of the compositions prepared according to the present invention, $Cu^{2+}$ and $Cu^{+}$ are prevented from corroding the steel and their electro-deposition on the surface of the steel is also prevented. A view may accordingly be held that, in the cleaning agent compositions according to the invention, the respective components cure deficiencies of the other components whereby to improve their efficiency, thus producing an excellent cleaning effect on scales.

In the compositions prepared according to the present invention, the solubility of the compound (complex salt) of the copper dissolving agent and copper is greatly increased by the use of a cleaning agent comprising an acid cleaning solution, which is made by adding a copper dissolving agent selected from thiourea or thiourea derivatives to the acid solution, and further adding hydrazine hydrate or other hydrazine compounds to the acid solution thus obtained. Said compositions therefore exhibit outstanding efficacy as a cleaning agent to remove the scales which contain a great deal of copper components such as copper or copper oxide; this is especially so when the compositions are used in removing the scales formed in the boiler of a steam electric-power plant which contain a great deal of the copper scale components such as copper foils found in the iron oxide scales. Even the removal of such scales that have hitherto required ammonia cleaning as an indispensable cleansing process can now be completed in a single process of acid cleaning and this can be done in a very short time. Moreover, since hydrazine or hydrazine compounds which are added to the cleaning agent have a reducing power, they prevent steel from being attacked by the corrosion of the oxidizing ions, such as $Fe^{3+}$, present in the acid solution.

The following examples illustrate the present invention; however, the invention is not intended to be limited by the details set forth in these examples. The examples clearly show excellent performance of compositions prepared according to the present invention, and further that hydrazine does not work as a reducing agent exclusively.

Example 1

Scale dissolving tests were conducted with boiler tubes 7 cm. in length which were cut from a boiler in the steam electric-power plant. In each test water side surfaces of the tube was covered with scales of 23 mg./cm.$^2$ on the average consisting of 50% $Fe_2O_3$, 20% CuO, 10.5%, ZnO, 4.5% NiO, 1.2% $SiO_2$ and 1.5% MgO+CaO. Both ends of the sample tube were respectively fitted tightly to flanges made of stainless steel and were connected with rubber tubes by the use of a rubber packing between the sample tube pipe and the flange so that the chemical solution might be stirred and circulated through the sample tube. The rubber tubes were connected to a glass vial, whose mouth was stopped tightly with a rubber stopper to keep out of touch with the outside air. An $N_2$ gas of high purity was used to stir the chemical solution once an hour so that the chemical solution in the sample tube might mix well with the chemical solution in the glass vial. After having mixed a chemical solution completely, the stopcock fitted to the glass vial was opened to take out the sample solution, which was then analyzed and the ions present were measured. Immediately after the acid treatment was over, the flanges and packings were taken from the sample tube, and the removal of the scales was examined with the naked eye.

The amount of the chemical solution used in the aforementioned test was prepared so as to be 2.5 ml. per 1 cm.$^2$ of the water side surfaces of the sample tube. The desired temperature of the cleaning agent was kept constant by putting the sample tube fitted with the flanges directly in a thermostatic water bath. The results obtained from tests conducted with the following solutions kept at 60° C. for six hours are shown in Table 1.

TABLE 1

| Composition of cleaning agent: Chemicals | Concentration, percent | Amount of ion rendered, p.p.m.: Fe | Cu | Corrosion rate, mg./cm.²/hr. | Removal percentage of scales |
|---|---|---|---|---|---|
| Hydrochloric acid | 5 | | | | |
| Thiourea | [1] 1/4 | 3,750 | 1,100 | 0.15 | 85 |
| Ibit 1-L | 0.5 | | | | |
| Hydrochloric acid | 5 | | | | |
| Thiourea | [1] 1/4 | | | | |
| Hexamethylene-tetramine | 0.2 | 3,400 | 850 | 0.09 | 80 |
| Ibit 1-L | 0.5 | | | | |
| Hydrochloric acid | 5 | | | | |
| Thiourea | [1] 1/4 | | | | |
| Hydrazine hydrate | [1] 1/20 | 3,300 | 1,550 | 0.012 | 100 |
| Hexamethylene-tetramine | 0.2 | | | | |
| Ibit 1-L | 0.5 | | | | |
| Hydrochloric acid | 5 | | | | |
| Thiourea | [1] 1/4 | | | | |
| Stannous chloride | [1] 1/20 | 3,300 | 850 | 0.012 | 85 |
| Hexamethylene-tetramine | 0.2 | | | | |
| Ibit 1-L | 0.5 | | | | |
| Hydrochloric acid | 5 | | | | |
| Thiourea | [1] 1/4 | | | | |
| L-ascorbic acid | [1] 1/20 | 3,150 | 900 | 0.012 | 85 |
| Hexamethylene-tetramine | 0.2 | | | | |
| Ibit 1-L | 0.5 | | | | |

[1] Mol/liter.

The "corrosion rate" and "removal percentage of scales" in the above table were measured by the following methods:

Corrosion rate

The mild steel specimen for the boiler (with a surface area of 25 cm.²) was put in the solution together with the boiler tube and the weight loss after the test was measured and the corrosion rate was represented by unit time, unit area, and weight loss as in the following formula, $$\frac{\text{weight loss of the specimen, mg.}}{\text{Area of the specimen, cm.}^2\ \text{Testing time, hr.}}$$

Removal percentage of scales

The ratio of the area where the scales were removed to the area which had been covered with the scales before the test was started, as observed with the naked eye (percent)

$$\frac{\text{Area exposed due to removed scales}}{\text{Area covered by scales before test}}\times 100$$

As seen from the test results mentioned above, the cleaning agent with hydrazine contained in it showed a greatly improved performance as compared with those containing other reducing agents. It is believed that hydrazine does not work exclusively as a reducing agent in the solution; however, since the procedure is intended to dissolve copper in the acid solution, copper or copper oxides, whether mixed in the iron oxide or existing between the layers of the iron oxide, is easily removed, unlike the ammonia solution method, because the iron oxide is dissolved and removed by the acid.

Example 2

The same procedure as described in Example 1 was carried out with boiler tubes of the boiler in a steam electric-power plant which was covered with scales of 50 mg./cm.² on the average consisting of 34% $Fe_2O_3$, 25% CuO, 36% ZnO, and 3.6% NiO. As for hydrazine compounds, hydrazine hydrochloride was used in the amount of 3.5 ml./cm.² in the test solution. The results thus obtained in the test are shown in Table 2.

TABLE 2

| Composition of cleaning agent: Chemicals | Concentration, percent | Amount of ion rendered, p.p.m.: Fe | Cu | Corrosion rate, mg./cm.²/hr. | Removal percentage of scales, percent |
|---|---|---|---|---|---|
| Hydrochloric acid | 5 | | | | |
| Thiourea | [1] 2/5 | | | | |
| Hydrazine hydrochloride | [1] 2/30 | 2,700 | 1,750 | 0.12 | 90-95 |
| Hexamethylene-tetramine | 0.2 | | | | |
| Ibit 1-L | 0.5 | | | | |
| Hydrochloric acid | 5 | | | | |
| Thiourea | [1] 2/5 | | | | |
| Hydrazine hydrochloride | [1] 2/25 | 2,300 | 2,560 | 0.11 | 100 |
| Hexamethylene-tetramine | 0.2 | | | | |
| Ibit 1-L | 0.5 | | | | |
| Hydrochloric acid | 5 | | | | |
| Thiourea | [1] 2/5 | | | | |
| Hydrazine hydrochloride | [1] 2/20 | 2,350 | 2,600 | 0.11 | 100 |
| Hexamethylene-tetramine | 0.2 | | | | |
| Ibit 1-L | 0.5 | | | | |

[1] mol/liter.

From the figures mentioned in the above table, it is clear that satisfactory results are to be obtained when more than ⅕ mol. calculated in terms of hydrazine or hydrazine compounds is added to 1 mol. of thiourea component.

The embodiments of the invention in which an exclusive property or privilege is claimed are defined as follows:

1. In an acidic cleaning composition for dissolving copper-containing iron oxide scale from metal surfaces comprising an aqueous solution of (1) at least one acid selected from the group consisting of hydrochloric acid, sulfuric acid, phosphoric acid and sulfamic acid, in an amount effective for dissolving iron oxide scale, (2) at least one thiourea-type compound selected from the group consisting of thiourea and thiourea derivatives, in an amount effective for dissolving copper, the improvement in which said solution contains (3) at least one hydrazine-type compound selected from the group consisting of hydrazine, a salt of hydrazine and hydrazine hydrate, in an amount of at least about ⅕ mol per one mole of said thiourea-type compound and effective for preventing precipitation of the thiourea-copper complexes formed in the solution during treatment of the metal surfaces.

2. A composition according to claim 1, in which the thiourea-type compound is selected from the group consisting of thiourea, dimethyl thiourea, diethyl thiourea and diphenyl thiourea.

3. A composition according to claim 1, in which the hydrazine-type compound is selected from the group consisting of hydrazine, hydrazine hydrate, hydrazine hydrochloride, hydrazine sulfate, hydrazine phosphate, hydrazine carbonate, hydrazine maleate, and hydrazine citrate.

4. A composition according to claim 1, in which said acid is a 0.1–20% hydrochloric acid solution and the thiourea-type compound is present at a concentration of about 0.5–10% in the acid solution.

5. A composition according to claim 1, in which said acid is a 3–10% hydrochloric acid solution, the thiourea-type compound is present at a concentration of 0.5–10% in the acid solution, and from about ¼ to about ½ mole of the hydrazine-type compound is present per 1 mole of the thiourea-type compound.

6. A composition according to claim 1, in which the acid is hydrochloric acid, the thiourea-type compound is thiourea, and the hydrazine-type compound is hydrazine hydrate.

7. A composition according to claim 1, in which the acid is a 0.1–20% hydrochloric acid solution, the thiourea has the concentration of 0.5–10% in the acid solution, and ¼–½ mole of hydrazine hydrate is present per 1 mole of thiourea.

References Cited

UNITED STATES PATENTS

| | | | |
|---|---|---|---|
| 3,458,354 | 7/1969 | Reich | 134—3 |
| 3,297,580 | 1/1967 | Pitzer | 252—142 |
| 2,499,283 | 2/1950 | Robinson | 252—148 |
| 2,959,555 | 11/1960 | Martin | 252—149 |
| 3,074,825 | 1/1963 | Gardner | 252—149 |
| 3,353,995 | 11/1967 | Teumac | 252—149 |
| 3,414,521 | 12/1968 | Teumac | 252—149 |
| 3,440,095 | 4/1969 | Larsonneur | 252—149 |

ROBERT F. BURNETT, Primary Examiner

M. E. McCAMISH, Assistant Examiner

U.S. Cl. X.R.

21—2.7; 134—3, 41; 252—82, 180, 181

UNITED STATES PATENT OFFICE
CERTIFICATE OF CORRECTION

Patent No. 3 686 123 Dated August 22, 1972

Inventor(s) Hiroshi Ueki

It is certified that error appears in the above-identified patent and that said Letters Patent are hereby corrected as shown below:

Please add the Priority Date of ---Japanese Serial No. 83800/1967, filed December 27, 1967---.

Change the inventor's name from "Ueki Hiroshi" to ---Hiroshi Ueki---.

Signed and sealed this 9th day of January 1973.

(SEAL)
Attest:

EDWARD M.FLETCHER,JR.
Attesting Officer

ROBERT GOTTSCHALK
Commissioner of Patents